March 31, 1970   E. L. KROPSCOTT ET AL   3,503,177
METHOD OF PACKAGING ARTICLES
Filed Feb. 13, 1967
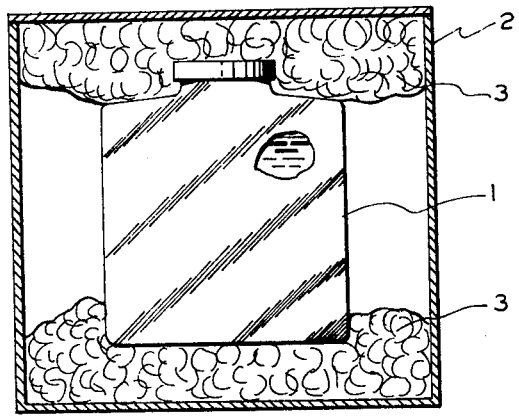
INVENTORS
EARLE L. KROPSCOTT
GUNNAR R. FRANSON
ROBERT G. HANLON
DENNIS L. KRUEGER
BY *Plumley, Tyner & Sandt*
ATTORNEYS United States Patent Office 3,503,177
Patented Mar. 31, 1970

3,503,177
METHOD OF PACKAGING ARTICLES
Earle L. Kropscott, Gunnar R. Franson, and Robert G. Hanlon, Midland, and Dennis L. Krueger, Brighton, Mich., assignors to The Dow Chemical Company, Midland, Mich., a corporation of Delaware
Filed Feb. 13, 1967, Ser. No. 615,675
Int. Cl. B65b 5/04, 21/00; B65d 81/14
U.S. Cl. 53—35
5 Claims

ABSTRACT OF THE DISCLOSURE

The controlled reexpansion of expandable, shrunken, preferably low density, polystyrene beads contained within air-permeable plastic bags is employed as a method for packaging delicate articles.

The use of plastic materials for packaging and protection of articles during storage, shipment and handling has become common practice, one of the most popular techniques being the use of plastic materials which may be in the form of foam or foamed in place around the article to be protected, thus giving a very light, packaged article which is characterized by the fact that the article is held firmly in place in a relatively shock-proof dust and moisture-resistant container.

Although this foamed in place technique has many advantages there are also disadvantages. Thus, for example, unless precautions are taken to divide the area into which the plastic is to be foamed into a plurality of separate areas, such as by means of cardboard, wooden or similar walls, it will be found difficult to remove the article from its surrounding foamed plastic in which the article is encased. Again, another disadvantage of the foamed in place technique resides in the fact that usually the foamed plastic cannot be reused after removal of the packaged article thereby giving rise to waste of the plastic.

The drawing represents, in perspective, an article 1 packaged in a box 2 while using collapsed or shrunken beads of this invention in sealed polyethylene bags 3.

According to this invention it has been found that by controlled reexpansion of the expandable, low density polystyrene beads of this invention in flexible bags or similar containers, a packaging material or device is obtained which upon reexpansion of the beads provides a positive, firm protection for packaged articles and which material is free from the disadvantages of the prior art, and advantageously, while providing a material or device which may be reused if desired.

In practicing this invention, expandable styrene polymer particles or granules are expanded or prefoamed, preferably by heating with steam at atmospheric pressure, then are cooled to room temperature whereupon the expanded beads shrink until they look like dried peas or raisins. It should be understood that the styrene polymer may be composed of and include copolymers of styrene containing up to 20% by weight of other monoolefinic polymerizable monomers. These shrunken beads are then sealed in a flexible bag, e.g. a polyethylene bag, that permits slow diffusion of air through its walls and into contact with the shrunken beads. As air diffuses through the walls of the flexible bags and walls of the cells of the shrunken beads they reinflate like tiny balloons thus exerting a firm holding and cushioning effect upon the article being packaged by use of the bags of reexpanded expandable beads.

In the use of polyethylene bags it has been foond that as air diffuses through the low permeability package and into the beads an equilibrium is reached and the particles do not expand further as they are restrained by the bag, the maximum pressure exerted by the particles while expanding being in the order of one pound per square inch. Thus, relatively delicate and fragile structures may be placed in a container with the shrunken but expandable particles in bags surrounding such structures and the particles allowed to slowly expand and support the article in a relatively uniform manner and maintain it in spaced relationship from the sides of the container.

According to the present invention, articles which beneficially may be packaged in containers include electrical instruments such as meters, tubes, valves, electronic assemblies, glass articles, delicate mechanical movements and the like. Inasmuch as the particles expand without adhering to one another, upon opening one of the containers, the bags of expanded particles are readily removed, the packaged articles easily taken from the container, and the expanded particles may be further used if desired.

It has been found that the rate of reexpansion of the expandable, low density, polystyrene beads can be varied by varying the rate at which air reaches the cell walls of the beads. For example in the case of sealed polyethylene bags at 21° C. there is a volume increase of about 20% in three hours, 35% in six hours and 55% in eight hours. If the bags are not sealed or are punctured there is a volume increase of about 75% in three hours and about 85% in six hours at about 21° C.

The partially collapsed polystyrene particles or granules of this invention are readily prepared by a variety of methods, one preferred method being that of heating polystyrene particles to a temperature sufficiently high to cause softening but not sufficiently high to permit the major portion of the blowing agent to escape from the particles, then foaming the particles to a bulk density of 0.15 to 0.75 pound per cubic foot and then cooling the expanded particles to cause partial collapse of the cell walls after which they are stored in a substantially air tight container.

According to a preferred embodiment of this invention, particularly low density, reexpandable polystyrene particles or shrunken beads are obtained when the solution viscosity of the polystyrene is from about 4 to 15 centipoise, preferably 6–10 centipoise (the viscosity of a 10% by weight solution of the polystyrene in toluene at 25° C.) when the following blowing agents are incorporated at concentrations of from about 4 to 12 weight percent based on the weight of the polystyrene:

(a) Neopentane/isopentane _____ 100/0 to 0/100
(b) Neopentane/neohexane _____ 100/0 to 10/90
(c) Neopentane/2,3-dimethyl butane __ 100/0 to 40/60
(d) Neopentane/n-pentane _____ 100/0 to 20/80
(e) Isopentane/n-pentane _____ 100/0 to 40/60
(f) Isopentane/neohexane _____ 100/0 to 30/70
(g) Isopentane/2,3-dimethyl butane __ 100/0 to 50/50
(h) Isopentane/trichlorofluorometh-
    ane _____ 100/0 to 40/60
(i) Neopentane/trichlorofluorometh-
    ane _____ 100/0 to 50/50

Significant savings in shipping costs as well as savings in warehouse space result from the use of such low density particles.

The actual preparation of the reexpandable polystyrene particles or shrunken beads of this invention can be accomplished by suspending polystyrene granules in water, adding about 6 to 12 weight percent of a volatile organic fluid as blowing agent, such as previously described, and then heating the mixture, while agitating, at about 100° C. at about atmospheric pressure until the expanded bead formation is obtained and then removing and cooling the resultant beads. Upon cooling to room temperature, about 21°–22° C., the tiny, balloon-like beads promptly collapse to the shrunken, i.e. the dried raisin or wrinkled pea, formation and are immediately stored, as previously indicated, in an air-tight container pending use in packaging operations.

The following examples illustrate, in detail, how the novel reexpandable polystyrene particles of this invention may be prepared.

EXAMPLE 1

A plurality of polystyrene granules were suspended in water and heated to a temperature of about 100° C. in a pressure vessel. Based on the total weight of the polystyrene, 12 weight percent of a mixture of 60 weight percent isopentane and 40 weight percent neopentane was added and the resultant mixture agitated for a period of 19 hours. The mixture was cooled and the polystyrene beads separated from the liquid phase. The polystyrene had a solution viscosity of 6 centipoises (viscosity of a 10 weight percent solution of polystyrene in toluene at 25° C.). Analysis of the treated polystyrene beads indicated that they contained 8.23 percent by weight of the pentanes. A portion of the foregoing particles was placed in a densitometer and heated to 99° C. for 4 minutes. An expansion of 129 volumes occurred. On cooling to about 22° C. the beads collapsed within 1 minute and had a total volume of 38 ($V_F/V_S$). The expanded beads were exposed to air at ambient room temperature of between about 21° and 24° C. for a period of about 64 hours and had a final volume of 108.

EXAMPLE 2

In a manner similar to Example 1, granules of polystyrene having a solution viscosity of 6 centipoises were treated with a mixture of 50 weight percent n-pentane and 50 weight percent neopentane to provide an expandable particle containing 6.96 percent by weight of the pentane mixture. The resultant expandable particles were expanded by heating for 5 minutes under a pressure of 8 pounds per square inch guage of steam. The expanded ball or balloon-like particles were removed from the steam treatment chamber and cooled to about 23° C. They collapsed and had a wrinkled exterior surface. After standing for 24 hours in air the volume of the beads reached 78 volumes and in 48 hours, 100 volumes.

As previously indicated, a unique property of the reexpandable polystyrene beads of this invention is their regeneration cycle and to use this property to advantage the heads are normally placed in polyethylene or other low permeability plastic bags soon after collapse. If the bag is closed against the beads but air is allowed to enter the bag the beads double in volume in about 3 to 6 hours. On the other hand, if the bag is tightly sealed the beads do not expand except to use up the air that existed between the beads and a slight vacuum is created within the bag which holds for about two weeks at which time the vacuum will have released and the bag will have regenerated to the extent of the equilibrium previously mentioned, due to the restraining effect of the bag walls, i.e. about one pound per square inch pressure exerted by the partially regenerated beads.

In making use of regeneration in packaging operations, the bags filled, or partially filled with beads in the collapsed state are packed around articles to be packaged, in a container, and in about 3 hours expansion is complete and the article is held tightly in a fixed position.

Drop testing by the ASTM D775–61 procedure using progressive drop heights was carried out using collapsed polystyrene beads prepared according to this invention having a density of 0.3 pound per cubic foot, in comparison with shredded paper and "Pelaspan-Pac," a tangled mass of foamed polystyrene strands in packing ½ gallon glass jugs of water. The results were as follows, using 3 drops at every 1 foot interval starting at 4 feet.

|  | Paper | "Pelaspan-Pac" | Beads |
|---|---|---|---|
| Height at breakage (ft.) | 7 | 8 | 6 |
| Number drops to breakage | 10 | 13 | 19 |

All materials were packed in identical corrugated paper boxes and in the same manner as illustrated in the drawing, the beads being packed around the jug in sealed polyethylene bags, in a collapsed state, and allowed to sit for one week before testing.

In a preferred embodiment of this invention and illustrating one of its important advantages, appreciable savings may be accomplished in cost of packing materials by packaging articles in a manner illustrated in the drawing wherein a gallon jug of water 1 was packaged in a corrugated paper box 2 with collapsed beads of this invention in sealed polyethylene bags 3 employed as end positioners of the jug. In 3 hours after packing, the jug could hardly be rotated and in 6 hours it was tightly and safely held in a fixed position in the cardboard box 2. As is obvious, the packaging of articles in such a manner gives rise to substantial savings not only in weight but in quantity of packing material employed.

Various changes may be made in the details and manipulative steps of this invention without departing therefrom or sacrificing the advantages thereof.

What is claimed is:

1. A method of packaging articles within a container which comprises resiliently positioning the articles to be packaged in spaced relationship from the inner walls of the container and from one another by means of closed, flexible, air-permeable, plastic bags containing air-reexpandable, shrunken, polystyrene beads, and allowing the shrunken polystyrene beads to reexpand and hold said articles in a fixed position.

2. The method of claim 1 in which the plastic bag is a polyethylene bag.

3. The method of claim 1 in which the flexible bags are punctured to permit rapid entrance of air after packaging of the article within the container.

4. The method of claim 1 in which the shrunken air-reexpandable polystyrene beads are prepared from a styrene polymer having a viscosity characteristic of from 4 to 15 centipoises as determined for a 10 percent by weight solution of the polymer in toluene at 25° C. and prepared while employing a blowing agent selected from the group consisting of neopentane, isopentane, neohexane, 2,3-dimethyl butane, n-pentane, isopentane, trichlorofluoromethane and mixtures thereof.

5. The method of claim 1 in which the articles are resiliently held at a pressure of no more than about one pound per square inch above atmospheric pressure.

References Cited

UNITED STATES PATENTS

| 3,204,385 | 9/1965 | De Remer et al. | 53—36 X |
| 3,222,843 | 12/1965 | Schneider | 53—36 X |
| 3,238,599 | 3/1966 | Bauman | 206—46 X |

TRAVIS S. McGEHEE, Primary Examiner

R. L. SPRUILL, Assistant Examiner

U.S. Cl. X.R.

206—46; 264—45, 53, 321